United States Patent
Ando (10) Patent No.: US 8,659,765 B2
(45) Date of Patent: Feb. 25, 2014

(54) THREE-DIMENSIONAL SHAPE DETERMINING APPARATUS AND THREE-DIMENSIONAL SHAPE DETERMINING METHOD

(71) Applicant: Canon Kabushiki Kaisha, Tokyo (JP)

(72) Inventor: Toshinori Ando, Inagi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/800,032

(22) Filed: Mar. 13, 2013

(65) Prior Publication Data

US 2013/0258354 A1 Oct. 3, 2013

(30) Foreign Application Priority Data

Mar. 30, 2012 (JP) ................ 2012-080161

(51) Int. Cl.
*G01B 11/24* (2006.01)
(52) U.S. Cl.
USPC ........................................ 356/603
(58) Field of Classification Search
USPC ................................. 356/601, 603
See application file for complete search history.

(56) References Cited

U.S. PATENT DOCUMENTS

| | | | | |
|---|---|---|---|---|
| 4,668,094 A | * | 5/1987 | Matsumoto et al. | 356/603 |
| 4,802,759 A | * | 2/1989 | Matsumoto et al. | 356/603 |
| 5,135,308 A | * | 8/1992 | Kuchel | 356/604 |
| 6,750,975 B2 | * | 6/2004 | Takeda et al. | 356/604 |
| 8,280,152 B2 | * | 10/2012 | Thiel et al. | 382/154 |
| 2010/0194855 A1 | | 8/2010 | Mamiya | |

FOREIGN PATENT DOCUMENTS

| | | |
|---|---|---|
| JP | 2009-042015 A | 2/2009 |
| JP | 2013-019729 A | 1/2013 |

OTHER PUBLICATIONS

K. Sato et al., "Liquid Crystal Range Finder—A High Speed Range-Imaging System Using Liquid Crystal Shutter", Systems and Computers in Japan, vol. 20, No. 8, (1989).

* cited by examiner

*Primary Examiner* — Roy M Punnoose
(74) *Attorney, Agent, or Firm* — Fitzpatrick, Cella, Harper & Scinto (57) ABSTRACT

Pattern lights A and B of which patterns respectively having bright and dark sections have been in an inverted relation are projected on a subject to calculate luminance distributions L1 and L2 of the subject and average values Ave(L1) and Ave(L2) of the distributions. A luminance distribution obtained by multiplying a luminance distribution L0 of the subject of only a natural light component by a coefficient η is subtracted from the luminance distribution L2 obtained by projecting the pattern light B on the subject and a correction value L2' thereof is calculated so that a difference e of the average values become zero. Then, an intersection point of the luminance distribution L1 obtained by projecting the pattern light A on the subject and the correction value L2' of the luminance distribution L2 obtained by projecting the pattern light B on the subject is derived.

10 Claims, 10 Drawing Sheets

FIG. 1

FIG. 2A
PATTERN LIGHT A

FIG. 2B
PATTERN LIGHT B

THREE-DIMENSIONAL SHAPE DETERMINING APPARATUS AND THREE-DIMENSIONAL SHAPE DETERMINING METHOD

BACKGROUND OF THE INVENTION

1. Field of the Invention

The present invention relates to a three-dimensional shape determining apparatus and a three-dimensional shape determining method, and particularly it relates to a technique which is suitably used to obtain three-dimensional shape data of a subject (or an object) by projecting pattern light on the subject and imaging the projected pattern light.

2. Description of the Related Art

A three-dimensional shape determining method of obtaining three-dimensional shape data of a subject by projecting pattern light serving as a marker on the subject and then imaging the projected pattern light is a technique which has been well known.

Here, the important factor to achieve this technique is to image the projected pattern light and then accurately calculate the position of the marker in an image obtained by imaging the projected pattern.

For example, the principle of a technique called a complementary pattern projection method has been introduced in "Journal of Institute of Electronics, Information and Communication Engineers, D, Vol. J71-D, No. 7, pp. 1249-1257". Besides, in a technique disclosed in Japanese Patent Application Laid-Open No. 2009-042015, the method same as above is used.

In the complementary pattern projection method, more specifically, two kinds of pattern lights which have bright and dark sections alternately inverted and by which complementary illumination distributions are formed on a surface of a subject are projected on the surface of the subject and an intersection point at which the bright and dark sections of these pattern lights intersect is used as a marker.

However, in the conventional method like this, in the case where the two kinds of pattern lights are projected and the projected pattern light is then imaged, if an intensity of ambient light (natural light) changes, there is a problem that an error may occur when the position of the marker is calculated.

The present invention, which has been completed in consideration of the above problem, aims to be able to accurately detect a point at which bright and dark sections of two kinds of pattern lights which were projected on a subject and in which the bright and dark sections thereof have been inverted intersect, even if ambient light changes.

SUMMARY OF THE INVENTION

A three-dimensional shape determining apparatus according to the present invention is characterized by comprising: a projection unit configured to project, on a subject, first pattern light which has a bright section and a dark section and second pattern light in which a relation of a bright section and a dark section thereof is inverted in regard to a relation of the bright section and the dark section of the first pattern light; a luminance distribution obtaining unit configured to obtain, by imaging the subject, a first luminance distribution of the subject in a state that the first pattern light has been projected, a second luminance distribution of the subject in a state that the second pattern light has been projected, and a third luminance distribution of the subject in a state that the first pattern light and the second pattern light are not projected; an intersection point deriving unit configured to derive an intersection point of the first luminance distribution and the second luminance distribution; and a three-dimensional shape deriving unit configured to derive a three-dimensional shape of the subject on the basis of the intersection point, wherein the intersection point deriving unit derives, by using a luminance distribution obtained by multiplying the third luminance distribution by a coefficient, the intersection point of the first luminance distribution and the second luminance distribution in a state that a component by ambient light included in a predetermined range of the first luminance distribution and a component by ambient light included in a predetermined range of the second luminance distribution have been set to be substantially equal to each other.

Further features of the present invention will become apparent from the following description of exemplary embodiments with reference to the attached drawings.

DESCRIPTION OF THE EMBODIMENTS

Hereinafter, exemplary embodiments of the present invention will be described with reference to the attached drawings.
(First Embodiment)
First of all, the first embodiment of the present invention will be described.

Figure 1:
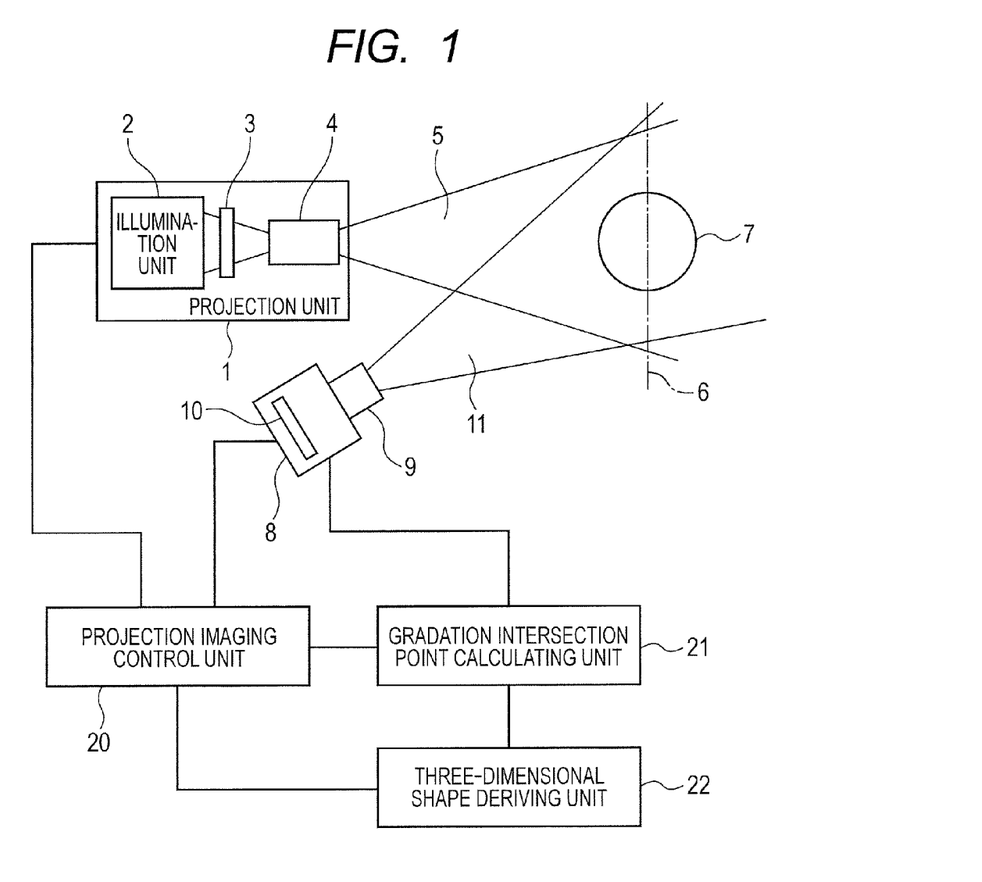
FIG. 1 is a block diagram illustrating a constitution of a three-dimensional shape determining apparatus.

FIG. 1 is a block diagram illustrating an example of a typical constitution of a three-dimensional shape determining apparatus.

In FIG. 1, a projection unit 1 includes a liquid crystal panel 3, an illumination unit 2 which illuminates the liquid crystal panel 3, and a projection optical system 4 which projects an image of the liquid crystal panel 3 on a subject (or an object) 7 disposed in the vicinity of a subject surface 6.

In response to an instruction issued from a later-described projection imaging control unit 20, the projection unit 1 projects predetermined pattern light on the subject 7 (refer to a projection luminous flux 5 illustrated in FIG. 1).

An imaging unit 8 includes an imaging element 10, and an imaging optical system 9 which forms on the imaging element 10 an image of the pattern light projected on the subject 7 as a luminance distribution.

In response to an instruction issued from the later-described projection imaging control unit 20, the imaging unit 8 performs an imaging operation, and then outputs the luminance distribution on the imaging element to a later-described gradation intersection point calculating unit 21 as a gradation distribution discretely sampled by the imaging element 10 (refer to an imaging flux 11 illustrated in FIG. 1).

The projection imaging control unit 20 issues the instruction to the projection unit 1 to project the predetermined pattern light on the subject 7, and also issues the instruction to the imaging unit 8 to image the pattern light on the subject 7, with predetermined timing or timing instructed by a user.

The gradation intersection point calculating unit calculates an intersection point of the luminance distributions which are obtained when two kinds of pattern lights are projected on the subject 7.

On the basis of the luminance distributions which are obtained when the two kinds of pattern lights are projected, a three-dimensional shape deriving unit 22 derives a three-dimensional shape of the subject 7 by using the intersection point calculated by the gradation intersection point calculating unit 21 as a marker. Incidentally, since a method of deriving the three-dimensional shape of the subject 7 can be achieved by a known technique, the detailed description of this method will be omitted here.

The three-dimensional shape determining apparatus has been set up under a not-illustrated environmental illumination (or ambient illumination). Consequently, it should be noted that the luminance distribution which is obtained by imaging the subject 7 is equivalent to a luminance distribution in which a luminance distribution which is obtained by the environmental illumination has been added to the luminance distribution which is obtained by the projected pattern light.

The projection imaging control unit 20 issues the instruction to the projection unit 1 to project at least two kinds of pattern lights A and B in turn. Consequently, in response to the instruction from the projection imaging control unit, the projection unit 1 projects the pattern lights A and B on the subject 7. Then, the projection imaging control unit 20 issues the instruction to the imaging unit 8 to image the subject 7 on which the two kinds of pattern lights A and B have been projected. Consequently, in response to the instruction from the projection imaging control unit, the imaging unit 8 images the subject 7 on which the pattern light A has been projected and the subject 7 on which the pattern light B has been projected, respectively.

Figure 2A:
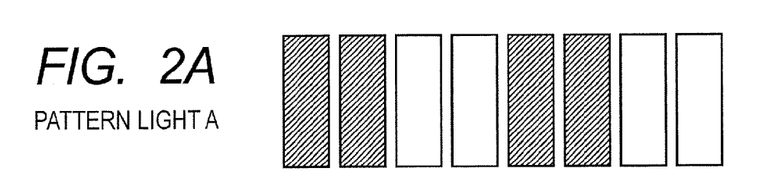
FIGS. 2A and 2B are diagrams respectively illustrating bright and dark states of each pixel respectively corresponding to pattern lights A and B.
Figure 2B:
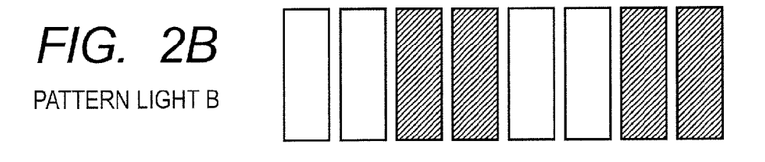

FIGS. 2A and 2B are diagrams respectively illustrating an example of bright and dark states of each pixel of the liquid crystal panel 3 respectively corresponding to the pattern lights A and B. More specifically, FIG. 2A shows the example of the bright and dark states of each pixel of the liquid crystal panel 3 corresponding to the pattern light A, and FIG. 2B shows the example of the bright and dark states of each pixel of the liquid crystal panel 3 corresponding to the pattern light B.

In FIGS. 2A and 2B, each of the white portions corresponds to the bright section, and each of the black portions corresponds to the dark section. Each of the pattern lights A and B has the pattern in which the bright section and the dark section exist alternately and repetitively. Further, in the pattern lights A and B, the bright sections and the dark sections are mutually inverted (that is, the region of the bright section in the pattern light A corresponds to the region of the dark section in the pattern light B, while the region of the dark section in the pattern light A corresponds to the region of the bright section in the pattern light B). Consequently, the complementary illumination distribution is formed on the subject surface 6.

In the present invention, it should be noted that the complementary pattern lights indicate the pattern lights of which the periodic patterns of the same illumination distribution are mutually shifted by a half phase (i.e., a half period).

Figure 3:
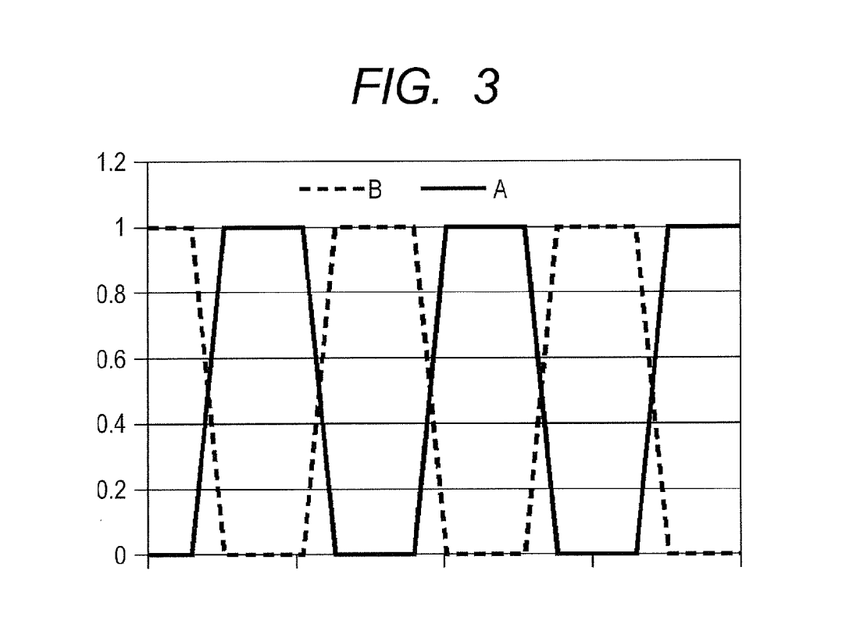
FIG. 3 is a diagram illustrating illumination distributions of two pattern lights which are in a complementary relation.

FIG. 3 is a diagram illustrating an example of the illumination distributions of the two pattern lights which are in the complementary relation. Here, it should be noted that, in each of FIGS. 3, 4 and 5, the horizontal axis indicates the position on the subject 7 on which the pattern light is projected, and the vertical axis indicates a value which is obtained by normalizing an illumination of the pattern light to be subjected to the subject 7 by the maximum illumination of the illumination distribution (projection pattern).

In FIG. 3, the solid line indicates the illumination distribution of the pattern light A, and the broken line indicates the illumination distribution of the pattern light B which is complementary to the pattern A. As described above, each of the two pattern lights A and B repeats the bright state and the dark state periodically, whereby the bright section and the dark section switch with each other. In other words, the two pattern lights A and B respectively have the phases which are in the relation being shifted by the half phase.

In the illumination distributions of the pattern lights illustrated in FIG. 3, it can be understood that the illumination changes linearly. The relevant pattern lights are ideal pattern lights as projection patterns for calculating the intersection point of the bright and dark sections of the respective pattern lights. However, in fact, each pattern light generally lacks the high-frequency component due to an imaging characteristic of the projection optical system 4, performance of the liquid crystal device for displaying the pattern, performance of a slide, and the like.

Figure 4:
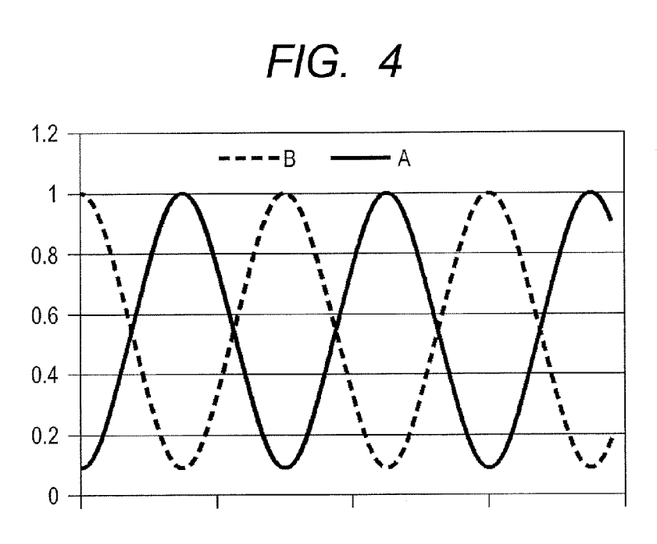
FIG. 4 is a diagram illustrating illumination distributions of pattern lights each of which lacks a high-frequency component.

FIG. 4 is the diagram illustrating an example of illumination distributions of such pattern lights each of which lacks a high-frequency component. Here, it should be noted that the illumination distribution illustrated in FIG. is formed and obtained based on the illumination distribution illustrated in FIG. 3 from which the high-frequency component has been lacked.

Figure 5:
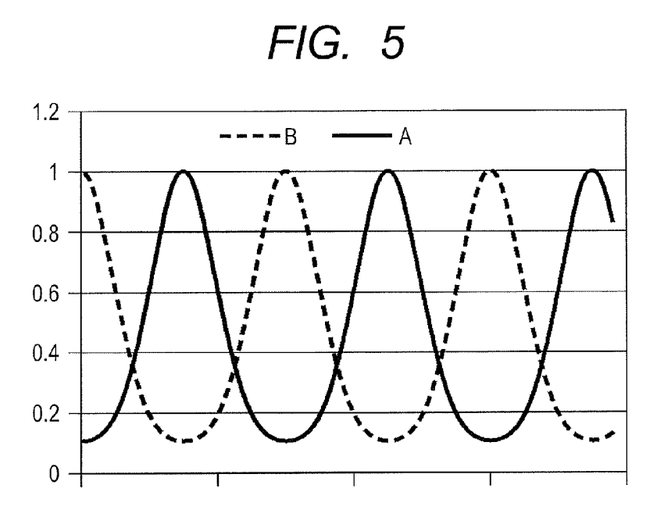
FIG. 5 is a diagram illustrating another example of illumination distributions of two pattern lights which are in a complementary relation.

FIG. 5 is the diagram illustrating another example of illumination distributions of two pattern lights which are in a complementary relation. Here, it should be noted that, for example, the technique described in Japanese Patent Application No. 2011-152342 (Japanese Patent Application Laid-Open No. 2013-019729) can be used to obtain the illumination distributions illustrated in FIG. 5. Also in FIG. 5, as well as FIGS. 3 and 4, the solid line indicates the illumination distribution of the pattern light A, and the broken line indicates the illumination distribution of the pattern light B. Moreover, each of the two pattern lights A and B repeats a bright state and a dark state periodically, and the two pattern lights A and B respectively have bright and dark phases which are in the relation being shifted by the half phase.

In the illumination distribution illustrated in FIGS. 3 and 4, the width of the bright section and the width of the dark section are equal to each other, and the intersection point of the two pattern lights A and B is at the center of the amplitude of the light. On the other hand, in the illumination distribution illustrated in FIG. 5, the width of the bright section is set to be narrower than the width of the dark section, whereby the intersection point of the pattern lights A and B is at the position where the illumination is smaller than that at the center of the amplitude.

The periods of the complementary pattern lights and the bright and dark patterns are the same, but the phases thereof are mutually shifted by the half phase. Therefore, the complementary pattern lights are mathematically equivalent to the patterns in which the average values of the illuminations of N periods (N is a positive integer) are equal, and the complementary pattern lights practically have the property in which the average values of the illuminations in the range including various periods are equal.

Next, luminance distributions of an image which is imaged and obtained when the pattern lights A and B are projected on the subject 7 will be described.

Figure 6:
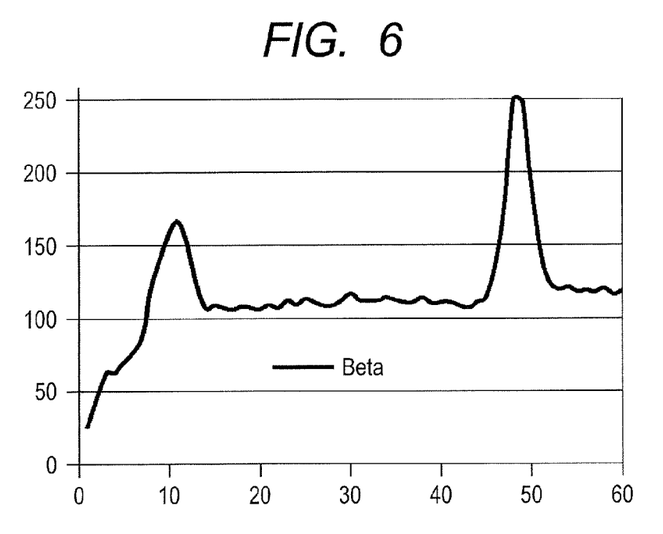
FIG. 6 is a diagram illustrating a luminance distribution of a subject which is obtained when uniform illumination light is projected.

FIG. 6 is a diagram illustrating an example of the luminance distribution of the subject 7 which is obtained when uniform illumination light is projected by the projection unit 1. Incidentally, it should be noted that, in each of FIGS. 6, 7 and 8, the vertical axis corresponds to the luminance of the image of the subject 7, and the horizontal axis indicates the position on the subject 7 on which the pattern light is projected. A change of the luminance distribution illustrated in each of FIGS. 6 to 8 is caused by a reflectance of the surface of the subject 7.

Figure 7:
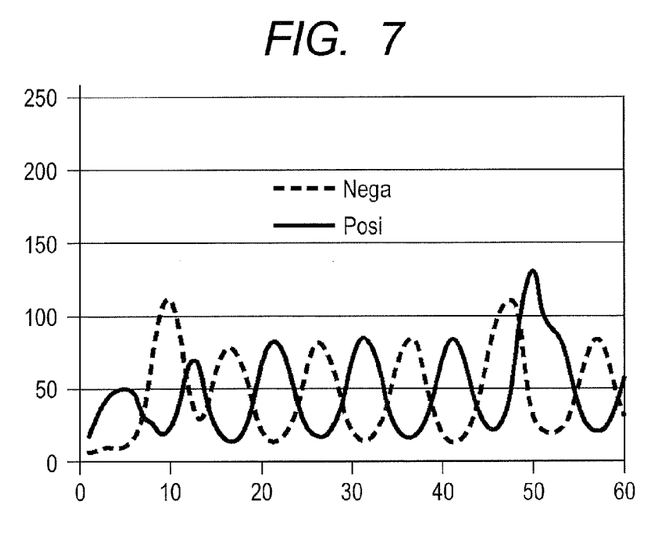
FIG. 7 is a diagram illustrating luminance distributions of the subject which are obtained only by the pattern lights A and B.

FIG. 7 is the diagram illustrating the luminance distributions of the subject 7 which are obtained when the complementary pattern lights (i.e., the pattern lights A and B) having the illumination distributions illustrated in FIG. 4 are projected on the subject 7 which is the same as the subject 7 from which the luminance distribution illustrated in FIG. 6 is obtained. In FIG. 7, the solid line indicates the luminance distribution of the subject 7 which is obtained when the pattern light A is projected, and the broken line indicates the luminance distribution of the subject 7 which is obtained when the pattern light B is projected.

Figure 8:
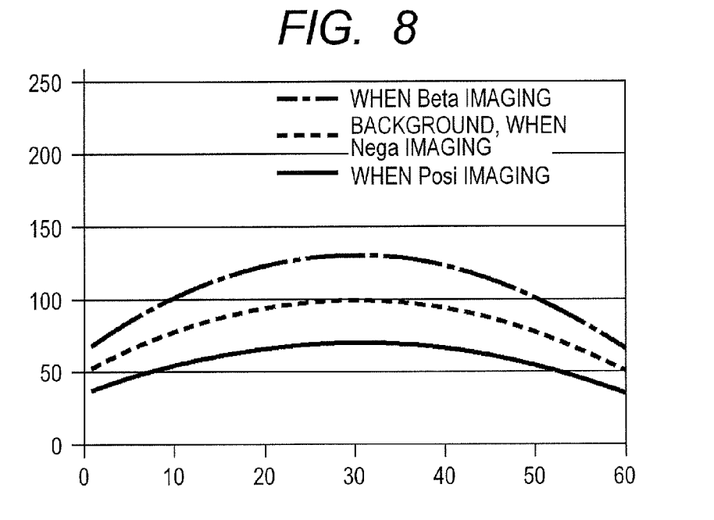
FIG. 8 is a diagram illustrating luminance distributions of the subject which are obtained only by natural light.

FIG. 8 is the diagram illustrating an example of the luminance distributions of the subject 7 which are obtained by natural light. Here, it is assumed that, for the sake of simplification of the description, the luminance increases by a light quantity illustrated in FIG. 8, irrespective of the reflectance of the subject 7.

Figure 9:
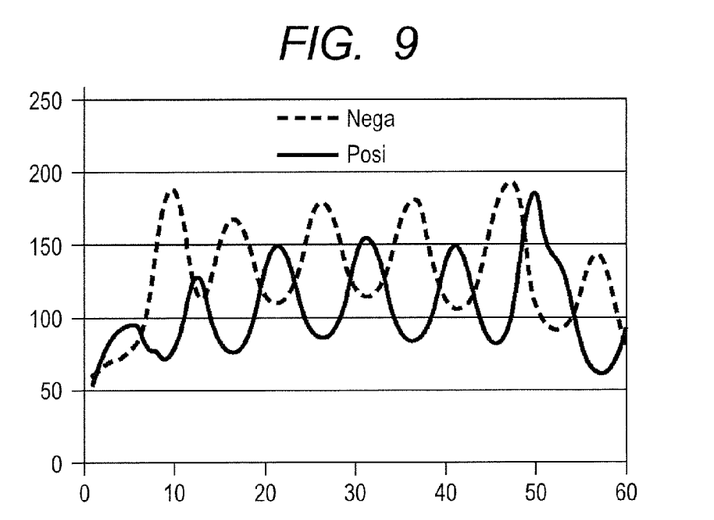
FIG. 9 is a diagram illustrating luminance distributions which are obtained by adding together the luminance distributions only by the complementary pattern lights and the luminance distributions only by the natural light.

FIG. 9 is a diagram illustrating luminance distributions which are obtained by adding together the luminance distributions (FIG. 7) of the subject 7 obtained only by the projection of the complementary pattern lights and the luminance distributions (FIG. 8) of the subject 7 obtained only by the natural light.

In FIG. 9, the solid line indicates the luminance distribution which is obtained by adding the solid-line luminance distribution illustrated in FIG. 8 (i.e., the luminance distribution of the subject 7 obtained by the natural light when the pattern light A is projected) to the luminance distribution (solid line) of the subject 7 obtained by the projection of the pattern light A illustrated in FIG. 7. On the other hand, the broken line indicates the luminance distribution which is obtained by adding the broken-line luminance distribution illustrated in FIG. 8 (i.e., the luminance distribution of the subject 7 obtained by the natural light when the pattern light B is projected) to the luminance distribution (broken line) of the subject 7 obtained by the projection of the pattern light B illustrated in FIG. 7.

In a distance measuring method in which the complementary pattern lights are used, basically the position at which the luminance of one pattern light is the same as that of the other pattern light is used as a marker (hereinafter, this position will be called "a luminance intersection point" or "an intersection point" as circumstances demand). However, the position of the intersection point in "the luminance distributions illustrated in FIG. 7" in which the luminance distribution of the image by the natural light is not included is apparently different from the position of the intersection point in "the luminance distributions illustrated in FIG. 9" in which the luminance distribution of the image by the natural light is included.

Figure 10:
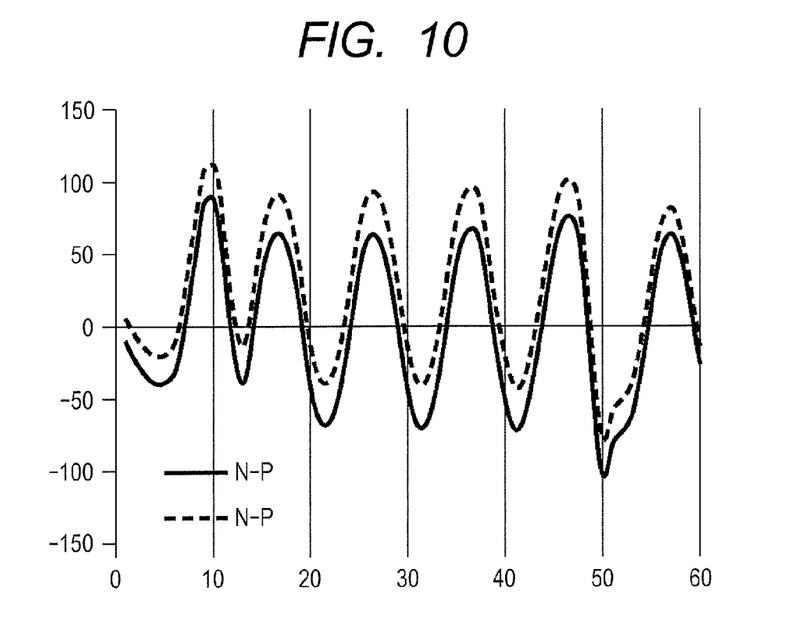
FIG. 10 is a diagram illustrating a difference between the luminance distributions which are obtained by the complementary pattern lights.

FIG. 10 is a diagram illustrating a difference between the luminance distributions which are obtained by the complementary pattern lights. More specifically, FIG. 10 is to indicate the positions of the intersection points of the luminance distributions by the complementary pattern lights, and the relevant intersection points are indicated by the intersection points between the curved line and the horizontal axis corresponding to the difference "0" between the luminance distributions.

In FIG. 10, the solid line indicates the luminance distribution which is obtained by subtracting the luminance distribution of the subject 7 obtained by the natural light when the pattern light A is projected from the luminance distribution of the subject 7 obtained when the pattern light B is projected (that is, the relevant luminance distribution is obtained by subtracting the solid-line luminance distribution from the broken-line luminance distribution in FIG. 7). On the other hand, the broken line indicates the luminance distribution which is obtained by subtracting the luminance distribution of the subject 7 obtained by the natural light when the pattern light A is projected from the luminance distribution of the subject 7 obtained by the natural light when the pattern light B is projected (that is, the relevant luminance distribution is obtained by subtracting the solid-line luminance distribution from the broken-line luminance distribution in FIG. 9).

As apparent from FIG. 10, since the luminance component by the natural light changes from the case where the pattern light A is projected to the case where the pattern light B is projected, the position at which the broken line and the "0" point intersect each other is shifted to the position which is different from the position, i.e., the original intersection point, at which the solid line and the "0" point intersect each other. Incidentally, in FIG. 7, the luminance distribution in the case where the natural light is not included is shown. When the natural light of the same quantity is included in both the case where the pattern light A is projected and the case where the pattern light B is projected, that is, when there is no time variation of the natural light, the natural light components are offset by obtaining the difference of the luminance distributions illustrated in FIG. 7, whereby the obtained result becomes equivalent to the solid line illustrated in FIG. 10.

Figure 11:
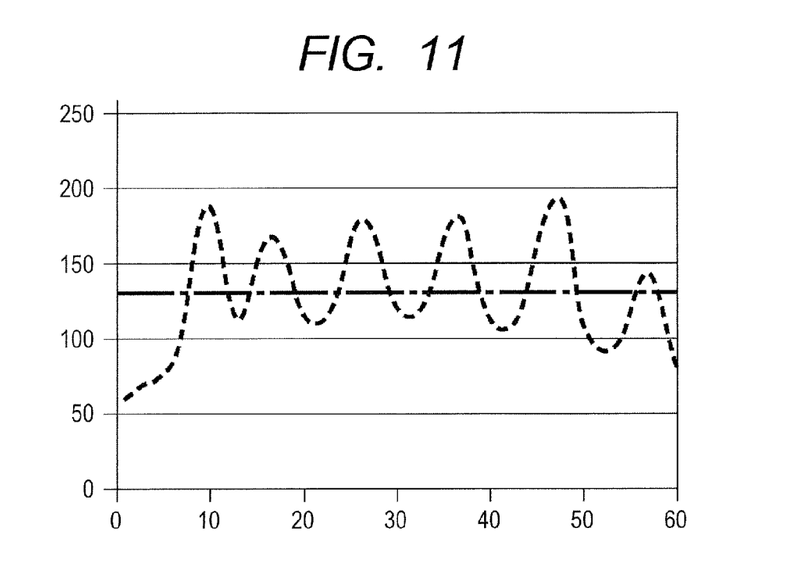
FIG. 11 is a diagram illustrating the luminance distribution which is obtained when the pattern light B is projected and the average value in its display interval.

FIG. 11 is a diagram illustrating, in the luminance distributions illustrated in FIG. 9, the luminance distribution (broken line) of the subject 7 which is obtained when the pattern light B is projected and the average value in its display interval (predetermined range). In FIG. 11, the average value is 130.7.

Figure 12:
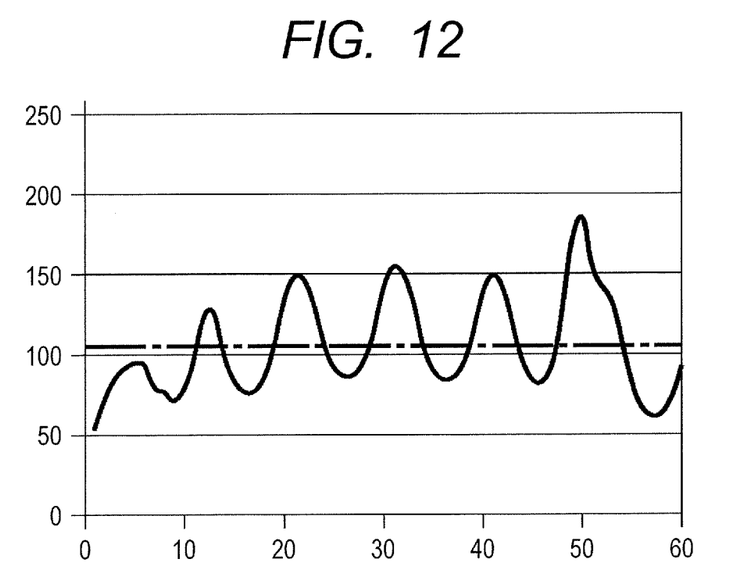
FIG. 12 is a diagram illustrating the luminance distribution which is obtained when the pattern light A is projected and the average value in its display interval.

FIG. 12 is a diagram illustrating, in the luminance distributions illustrated in FIG. 9, the luminance distribution (solid line) of the subject 7 which is obtained when the pattern light A is projected and the average value in its display interval (predetermined range). In FIG. 12, the average value is 105.6.

Here, the difference of 25.1 (130.7−105.6) is generated between the average value of the luminance distribution of the subject 7 obtained when the pattern light A is projected and the average value of the luminance distribution of the subject 7 obtained when the pattern light B is projected.

The pattern light A and the pattern light B respectively correspond to the complementary patterns of which the phases are mutually shifted by the half phase but which have the same illumination distribution, whereby the average values thereof are equal. Therefore, it is expected that the average values of the reflection lights which are obtained respectively when the pattern lights A and B are projected to the subject 7 are substantially equal. Thus, it is conceivable that the above difference (=25.1) of the average values is caused by the natural light components which are obtained when the respective pattern lights A and B are irradiated.

For this reason, in order to eliminate the above difference between the average values (to reduce the above difference to "0"), it only has to add or subtract (addition or subtraction) the natural light distribution which is equal to the above difference to or from either one of the luminance distributions of the subject 7 which are obtained respectively when the pattern lights A and B are projected.

Figure 13:
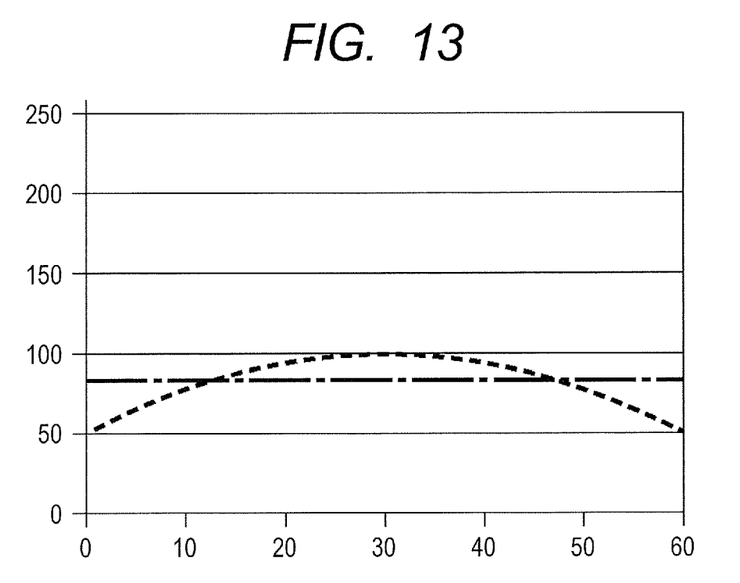
FIG. 13 is a diagram illustrating the luminance distribution of the subject of only a natural light component which is obtained when the pattern light B is projected.

FIG. 13 is a diagram illustrating an example of the luminance distribution of the subject 7 which is obtained only by the natural light component obtained when the complementary pattern lights are not projected but the pattern light B is projected. In the drawing, the broken line indicates the luminance distribution of the subject 7 which is obtained only by the natural light component, and the alternate long and short dash line indicates the average value in its display interval (predetermined range). In this case, the average value is 83.3.

Here, it is assumed that the luminance distribution of the subject 7 obtained only by the natural light component varies with time while maintaining the distribution illustrated in FIG. 13. In that case, to reduce the above difference (=25.1) between the average values to "0", it is necessary to set the average value of the luminance distribution of the subject 7 obtained when the pattern light A is projected and the average value of the luminance distribution of the subject 7 obtained when the pattern light B is projected to be equal to each other. Therefore, it is necessary to reduce the luminance distribution obtained by the natural light illustrated in FIG. 13 and subtract it from the luminance distribution obtained by the pattern light B illustrated in FIG. 11.

Here, since 25.1/83.3=0.30, the luminance distribution which is obtained by multiplying the luminance distribution (broken line) obtained by the natural light illustrated in FIG. 13 by 0.30 is subtracted from the luminance distribution obtained by the pattern light B illustrated in FIG. 11.

Figure 14:
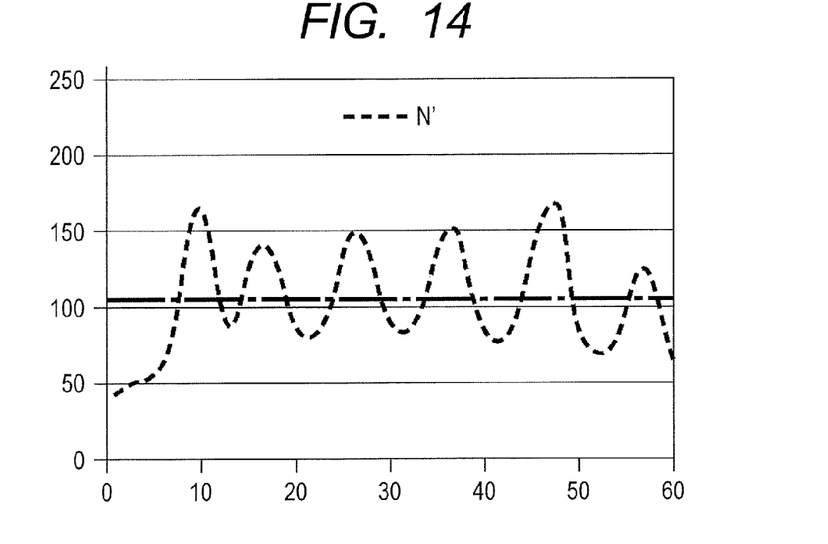
FIG. 14 is a diagram illustrating the luminance distribution after correction which is obtained by the pattern light B.

FIG. 14 is a diagram illustrating an example of the above-calculated luminance distribution after the correction which is obtained by the pattern light B. As indicated by the alternate long and short dash line in FIG. 14, the average value of the luminance distribution after the correction obtained by the pattern light B is equal to the average value of the luminance-section program by the pattern light A (see the alternate long and short dash line in FIG. 12).

The luminance intersection point is calculated by obtaining the difference between the luminance distribution obtained by the pattern light A illustrated in FIG. 12 and the luminance distribution obtained by the pattern light B illustrated in FIG. 14, and then obtaining the coordinates on the subject 7 at which the value of the obtained difference is "0".

Figure 15:
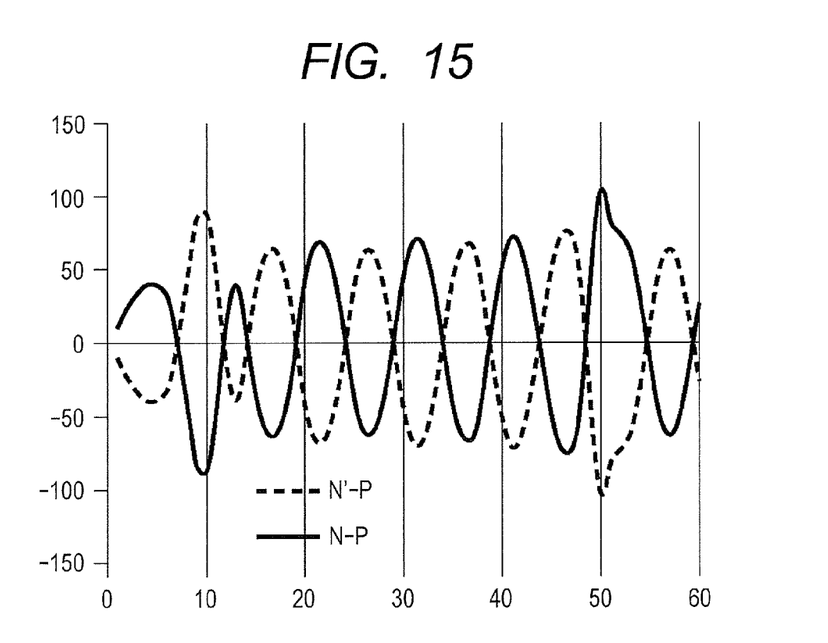
FIG. 15 is a diagram illustrating a difference between the luminance distributions after correction which are obtained by the complementary pattern lights.

FIG. 15 is a diagram illustrating an example of the difference between the luminance distributions which are obtained by the complementary pattern lights. In FIG. 15, the solid line indicates a case where there is no difference of the natural light components between the complementary pattern lights or a case where there is no natural light, and this solid line is equivalent to the solid line illustrated in FIG. 10. On the other hand, the broken line indicates a case where the difference of the natural light components is generated between the complementary pattern lights and a case where the technique in the present embodiment is applied, and this broken line is equivalent to the distribution of the difference between the luminance distribution obtained by the pattern light A illustrated in FIG. 12 and the luminance distribution after the correction obtained by the pattern light B illustrated in FIG. 14. Incidentally, in FIG. 15, the solid line and the broken line are plotted as a matter of convenience so that the symbols thereof are reversed, whereby it is possible to easily understand the difference of the positions of these lines crossing the "0" point.

As illustrated in FIG. 15, it can be understood that the difference from the position at which the luminance by the pattern light A is "0" is remarkably small in regard to the distribution of the difference in the case illustrated in FIG. 10 where the technique in the present embodiment is not applied (that is, the case where the luminance distribution obtained by the pattern light B is not corrected).

Figure 16:
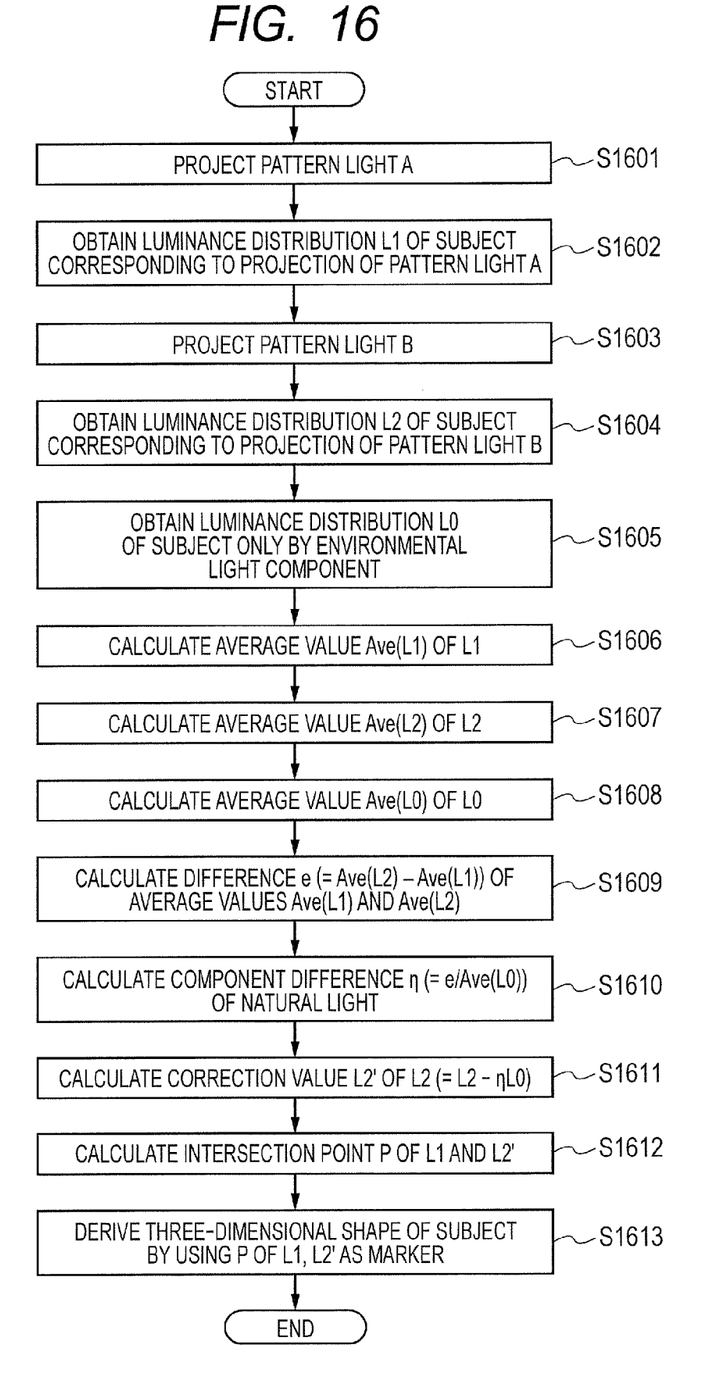
FIG. 16 is a flow chart indicating a first example of a process which is performed by the three-dimensional shape determining apparatus.

FIG. 16 is a flow chart indicating an example of a process which is performed by the three-dimensional shape determining apparatus according to the present embodiment.

First, in a step S1601, the projection unit 1 projects the pattern light A on the subject 7 as an example of a first pattern light, in response to the instruction from the projection imaging control unit 20 (first projection is performed).

Next, in a step S1602, the imaging unit 8 performs the imaging operation and thus obtains a luminance distribution L1, as an example of a first luminance distribution, of the subject 7 on which the pattern light A was projected, in response to the instruction from the projection imaging control unit 20 (first luminance distribution obtaining is performed).

Next, in a step S1603, the projection unit 1 projects the pattern light B on the subject 7 as an example of a second pattern light, in response to the instruction from the projection imaging control unit 20 (second projection is performed).

Next, in a step S1604, the imaging unit 8 performs the imaging operation and thus obtains a luminance distribution L2, as an example of a second luminance distribution, of the subject 7 on which the pattern light B was projected, in response to the instruction from the projection imaging control unit 20 (second luminance distribution obtaining is performed).

Next, in a step S1605, the imaging unit 8 performs the imaging operation and thus obtains a luminance distribution L0, as an example of a third luminance distribution, of the subject 7 only by the natural light (ambient light) in the case where the pattern light B was projected, in response to the instruction from the projection imaging control unit 20 (third luminance distribution obtaining is performed).

Next, in a step S1606, the gradation intersection point calculating unit 21 calculates an average value Ave(L1) of the luminance distribution L1 of the subject 7 on which the pattern light A was projected.

Next, in a step S1607, the gradation intersection point calculating unit 21 calculates an average value Ave(L2) of the luminance distribution L2 of the subject 7 on which the pattern light B was projected.

Next, in a step S1608, the gradation intersection point calculating unit 21 calculates an average value Ave(L0) of the luminance distribution L0 of the subject 7 obtained only by the natural light component.

Next, in a step S1609, the gradation intersection point calculating unit 21 calculates a difference e (=Ave(L2)−Ave(L1)) by subtracting the average value Ave(L1) of the luminance distribution L1 of the subject 7 from the average value Ave(L2) of the luminance distribution L2 of the subject 7.

Next, in a step S1610, the gradation intersection point calculating unit 21 calculates a component difference η (=e/Ave(L0)) of the natural light by dividing the difference e of the average values of the luminance distributions L1 and L2 of the subject 7 by the average value Ave(L0) of the luminance distribution L0 of the subject 7 only by the natural light component.

Next, in a step S1611, the gradation intersection point calculating unit 21 calculates a correction value L2' (=L2−ηL0) of the luminance distribution of the subject 7 by subtracting, from the luminance distribution L2 of the subject 7, the value obtained by multiplying the luminance distribution L0 of the subject 7 only of the natural light component by the component difference η of the natural light.

Next, in a step S1612, the gradation intersection point calculating unit 21 calculates an intersection point P between the luminance distribution L1 of the subject 7 and the correction value L2' of the luminance distribution of the subject 7 (intersection point is derived).

Finally, in a step S1613, the three-dimensional shape deriving unit 22 derives the three-dimensional shape of the subject 7 by using, as the marker, the intersection point P between the luminance distribution L1 of the subject 7 and the correction value L2' of the luminance distribution of the subject 7 (three-dimensional shape is derived).

As just described, in the present embodiment, the patterns A and B that the relation of the bright and dark sections of one pattern light is inverted in regard to the relation of the bright and dark sections of the other pattern light are projected on the subject 7, and the luminance distributions L1 and L2 of the subject 7 and the average values Ave(L1) and Ave(L2) thereof in the respective pattern lights are calculated. Then, the correction value L2' is calculated by subtracting, from the luminance distribution L2 obtained by projecting the pattern light B on the subject 7, the luminance distribution obtained by multiplying the luminance distribution L0 of the subject 7 only of the natural light component by the coefficient η, so as to reduce the difference between the average values to "0". Further, the intersection point between the luminance distribution L1 obtained by projecting the pattern light A on the subject 7 and the correction value L2' of the luminance distribution L2 obtained by projecting the pattern light B on the subject 7 is derived. By doing so, it is possible to reduce the difference between the natural light component included in the luminance distribution L1 obtained by projecting the pattern light A on the subject 7 and the natural light component included in the luminance distribution L2 obtained by projecting the pattern light B on the subject 7. Therefore, even if the natural light (ambient light) changes between the case where the pattern light A is projected on the subject 7 and the case where the pattern light B is projected on the subject 7, it is possible to accurately detect the point at which the bright and dark sections of the luminance distributions L1 and L2 respectively obtained by projecting the pattern lights A and B on the subject 7 intersect.

In the present embodiment, the correction value L2' of the luminance distribution L2 is calculated by subtracting, from the luminance distribution L2 obtained by projecting the pattern light B on the subject 7, the luminance distribution obtained by multiplying the luminance distribution L0 of the subject 7 only of the natural light component by the coefficient η. However, it only has to add or subtract the luminance distribution obtained by multiplying the luminance distribution L0 of the subject 7 only of the natural light component by the coefficient to or from either one of the luminance distributions L1 and L2 of the subject 7, so that the average values Ave(L1) and Ave(L2) of the respective luminance distributions L1 and L2 of the subject 7 become equal.

For example, it is possible to calculate a difference e (=Ave(L1)−Ave(L2)) in the step S1609, calculate a correction value L1' (=L1−ηL0) of the luminance distribution of the subject 7 in the step S1611, and calculate an intersection point P between the correction value L1' of the luminance distribution of the subject 7 and the luminance distribution L2 of the subject 7 in the step S1612.

Further, it is possible to calculate the difference e (=Ave(L1)−Ave(L2)) in the step S1609, calculate a correction value L2' (=L2+ηL0) of the luminance distribution of the subject 7 in the step S1611, and calculate an intersection point P between the correction value L2' of the luminance distribution of the subject 7 and the luminance distribution L1 of the subject 7 in the step S1612.

Furthermore, it is possible to calculate the difference e (=Ave(L2)−Ave(L1)) in the step S1609, calculate a correction value L1' (=L1+ηL0) of the luminance distribution of the subject 7 in the step S1611, and calculate an intersection point P between the correction value L1' of the luminance distribution of the subject 7 and the luminance distribution L2 of the subject 7 in the step S1612.

(Second Embodiment)

Subsequently, the second embodiment of the present invention will be described. Incidentally, it is exemplified in the first embodiment that the luminance distribution which is obtained by multiplying the luminance distribution L0 of the subject 7 only of the natural light component by the coefficient is subtracted from the luminance distribution L2 of the subject 7 so that the respective average values Ave(L1) and Ave(L2) of the luminance distributions L1 and L2 of the subject 7 become equal. On the other hand, in the present embodiment, a luminance distribution which is obtained by multiplying the luminance distribution L0 of the subject 7 only of the natural light component by a coefficient is added or subtracted in regard to a difference distribution which is the difference between the luminance distributions L1 and L2 of the subject 7, so that the average value of the relevant difference distribution becomes zero. As just described, a part of the process of obtaining the intersection point of the luminance distributions L1 and L2 of the subject 7 is mainly different between the present embodiment and the first embodiment. Consequently, in the present embodiment, detailed descriptions of the portions same as those in the first embodiment will be omitted by properly adding the reference numerals and symbols same as those disclosed in FIGS. 1 to 16.

In the present embodiment, the difference distribution is obtained by subtracting the luminance distribution L1 of the subject 7 which is obtained when the pattern light A is projected from the luminance distribution L2 of the subject 7 which is obtained when the pattern light B is projected. The obtained difference distribution has the shape which is indicated by the dotted line illustrated in FIG. 10. If the average value of the difference distribution is calculated, the calculated value is equal to the difference between the average value of the luminance distribution L1 of the subject 7 which is obtained when the pattern light A is projected and the average value of the luminance distribution L2 of the subject 7 which is obtained when the pattern light B is projected. Consequently, in the present embodiment, the value which is obtained by multiplying the luminance distribution L0 of the natural light by the coefficient is subtracted from the difference distribution so as to set the difference of these average values to zero.

Figure 17:
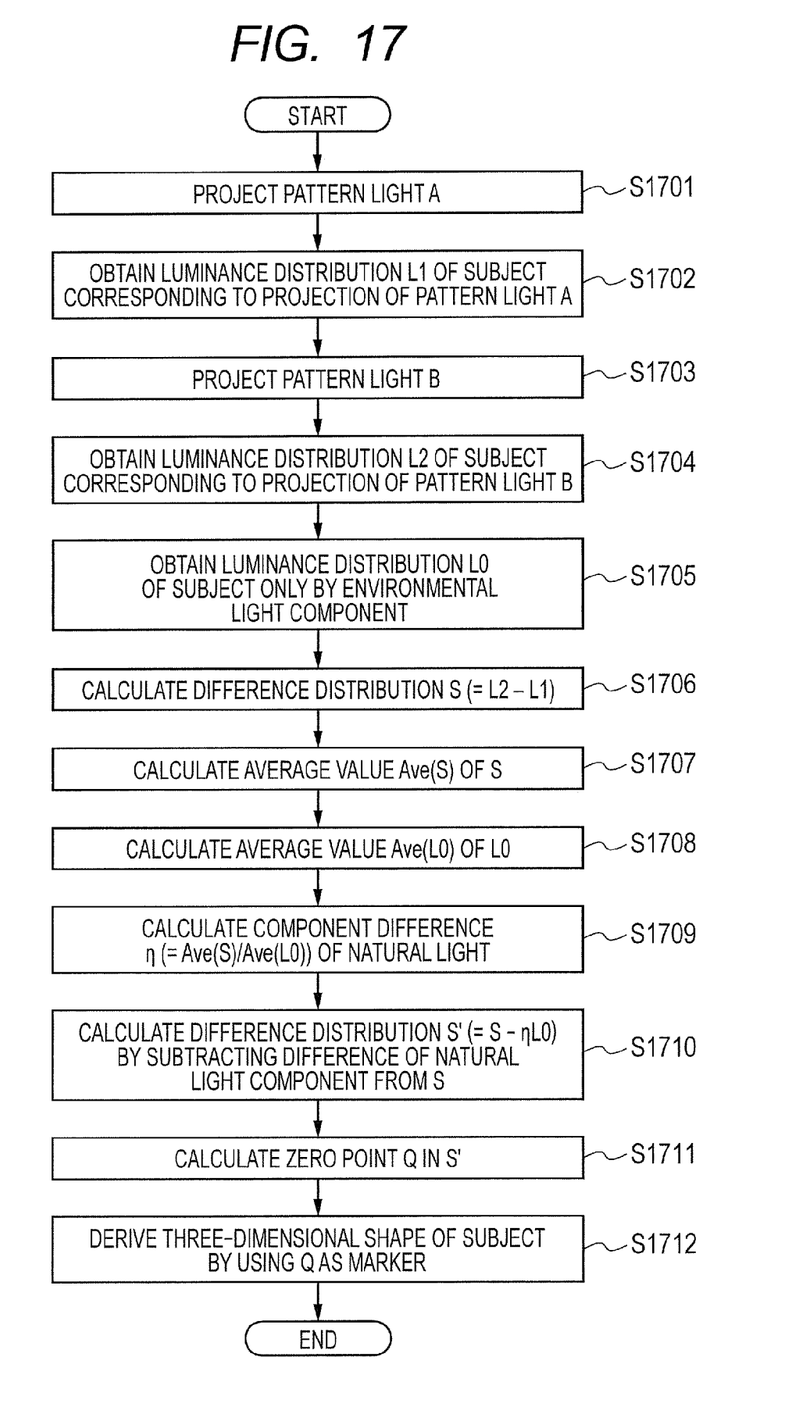
FIG. 17 is a flow chart indicating a second example of a process which is performed by the three-dimensional shape determining apparatus.

FIG. 17 is a flow chart for describing an example of a process which is performed by the three-dimensional shape determining apparatus, according to the present embodiment.

First, in a step S1701, the projection unit 1 projects the pattern light A on the subject 7 as an example of a first pattern light, in response to the instruction from the projection imaging control unit 20 (first projection is performed).

Next, in a step S1702, the imaging unit 8 performs the imaging operation and thus obtains the luminance distribution L1, as an example of a first luminance distribution, of the subject 7 on which the pattern light A was projected, in response to the instruction from the projection imaging control unit 20 (second luminance distribution obtaining is performed).

Next, in a step S1703, the projection unit 1 projects the pattern light B on the subject 7 as an example of a second pattern light, in response to the instruction from the projection imaging control unit 20 (second projection is performed).

Next, in a step S1704, the imaging unit 8 performs the imaging operation and thus obtains the luminance distribution L2, as an example of a second luminance distribution, of the subject 7 on which the pattern light B was projected, in response to the instruction from the projection imaging control unit 20 (second luminance distribution obtaining is performed).

Next, in a step S1705, the imaging unit 8 performs the imaging operation and thus obtains the luminance distribution L0, as an example of a third luminance distribution, of the subject 7 only by the natural light (ambient light) in the case where the pattern light B was projected, in response to the instruction from the projection imaging control unit 20 (third luminance distribution obtaining is performed).

Next, in a step S1706, the gradation intersection point calculating unit 21 calculates a difference distribution S (=L2−L1) by subtracting the luminance distribution L1 of the subject 7 on which the pattern light A was projected, from the luminance distribution L2 of the subject 7 on which the pattern light B was projected.

Next, in a step S1707, the gradation intersection point calculating unit 21 calculates an average value Ave(S) of the difference distribution S.

Next, in a step S1708, the gradation intersection point calculating unit 21 calculates an average value Ave(L0) of the luminance distribution L0 of the subject 7 obtained only by the natural light component.

Next, in a step S1709, the gradation intersection point calculating unit 21 calculates a component difference $\eta$ (=Ave(S)/Ave(L0)) of the natural light by dividing the average value Ave(S) of the difference distribution S by the average value Ave(L0) of the luminance distribution L0 of the subject 7 only by the natural light component.

Next, in a step S1710, the gradation intersection point calculating unit 21 calculates a correction value S' (=S−$\eta$L0) of the difference distribution by subtracting, from the difference distribution S, the value obtained by multiplying the luminance distribution L0 of the subject 7 only of the natural light component by the component difference $\eta$ of the natural light.

Next, in a step S1711, the gradation intersection point calculating unit 21 calculates a point (zero point) Q at which the luminance is zero in the correction value S' of the difference distribution (intersection point is derived).

Finally, in a step S1712, the three-dimensional shape deriving unit 22 derives the three-dimensional shape of the subject 7 by using, as the marker, the point (zero point) Q at which the luminance is zero in the correction value S' of the difference distribution (three-dimensional shape is derived).

It is also possible in the present embodiment to have the same effect as that described in the first embodiment.

According to the present embodiment, in the step S1706, the difference distribution S is calculated by subtracting the luminance distribution L1 of the subject 7 on which the pattern light A was projected from the luminance distribution L2 of the subject 7 on which the pattern light B was projected. Further, in the step S1710, the correction value S' (=S−$\eta$L0) of the difference distribution is calculated by subtracting, from the difference distribution S, the value obtained by multiplying the luminance distribution L0 of the subject 7 only of the natural light component by the component difference $\eta$ of the natural light. However, it only has to add or subtract the luminance distribution obtained by multiplying the luminance distribution L0 of the subject 7 only of the natural light component by the coefficient to or from the difference distribution, so that the average value of the difference distribution which is the difference between the luminance distributions L1 and L2 of the subject 7 becomes zero. In other words, it only has to obtain the difference distribution S (=L1−L2) in the step S1706 and calculate the correction value S' (=S−$\eta$L0) of the difference distribution in the step S1710.

Incidentally, it should be noted that the above embodiments merely present the examples of concretization for implementing the present invention, whereby the technical concept of the present invention must not be interpreted in a limited way. That is, it should be noted that the present invention can be implemented in multiple ways without departure from its technical concept or its main features.

(Other Embodiments)

The embodiments of the present invention can also be realized by a computer of a system or apparatus that reads out and executes computer executable instructions recorded on a storage medium (e.g., a non-transitory computer-readable storage medium) to perform the functions of one or more of the above-described embodiments of the present invention, and by a method performed by the computer of the system or apparatus by, for example, reading out and executing the computer executable instructions from the storage medium to perform the functions of one or more of the above-described embodiments. The computer may comprise one or more of a central processing unit (CPU), a micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to the exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-080161, filed Mar. 30, 2012, which is hereby incorporated by reference herein in its entirety.

What is claimed is:

1. A three-dimensional shape determining apparatus comprising:
    a projection unit configured to project, on a subject, first pattern light which has a bright section and a dark section and second pattern light in which a relation of a bright section and a dark section thereof is inverted in regard to a relation of the bright section and the dark section of the first pattern light;
    a luminance distribution obtaining unit configured to obtain, by imaging the subject, a first luminance distribution of the subject in a state that the first pattern light has been projected, a second luminance distribution of the subject in a state that the second pattern light has been projected, and a third luminance distribution of the subject in a state that the first pattern light and the second pattern light are not projected;
    an intersection point deriving unit configured to derive an intersection point of the first luminance distribution and the second luminance distribution; and
    a three-dimensional shape deriving unit configured to derive a three-dimensional shape of the subject on the basis of the intersection point,
    wherein the intersection point deriving unit derives, on the basis of the third luminance distribution, the intersection point of the first luminance distribution and the second luminance distribution in a state that a component by ambient light included in a predetermined range of the first luminance distribution and a component by ambient light included in a predetermined range of the second luminance distribution have been set to be substantially equal to each other.

2. The three-dimensional shape determining apparatus according to claim 1, wherein the intersection point deriving unit performs addition or subtraction of a luminance distribution, obtained by multiplying the third luminance distribution by a coefficient, to either one of the first luminance distribution and the second luminance distribution so that an average value in the predetermined range of the first luminance distribution and an average value in the predetermined range of the second luminance distribution become equal to each other, and derives the intersection point by using a luminance distribution obtained after the addition or the subtraction was performed.

3. The three-dimensional shape determining apparatus according to claim 2, wherein the coefficient is a value which is obtained by dividing a difference between the average value in the predetermined range of the first luminance distribution and the average value in the predetermined range of the second luminance distribution by an average value in a predetermined range of the third luminance distribution.

4. The three-dimensional shape determining apparatus according to claim 1, wherein the intersection point deriving unit performs addition or subtraction of a luminance distribution, obtained by multiplying the third luminance distribution by a coefficient, to a difference distribution which is a difference in the predetermined ranges between the first luminance distribution and the second luminance distribution so that an average value of the difference distribution becomes zero, and derives the intersection point by using the difference distribution obtained after the addition or the subtraction was performed.

5. The three-dimensional shape determining apparatus according to claim 4, wherein the coefficient is a value which is obtained by dividing an average value in a predetermined range of the difference distribution by an average value in a predetermined range of the third luminance distribution.

6. A three-dimensional shape determining method comprising:
    projecting first pattern light which has a bright section and a dark section, on a subject;
    projecting second pattern light in which a relation of a bright section and a dark section thereof is inverted in regard to a relation of the bright section and the dark section of the first pattern light, on the subject;
    obtaining, by imaging the subject, a first luminance distribution of the subject in a state that the first pattern light has been projected;
    obtaining, by imaging the subject, a second luminance distribution of the subject in a state that the second pattern light has been projected;
    obtaining, by imaging the subject, a third luminance distribution of the subject in a state that the first pattern light and the second pattern light are not projected;
    deriving an intersection point of the first luminance distribution and the second luminance distribution; and
    deriving a three-dimensional shape of the subject on the basis of the derived intersection point,
    wherein the intersection point of the first luminance distribution and the second luminance distribution is derived on the basis of the third luminance distribution, in a state that a component by ambient light included in a predetermined range of the first luminance distribution and a component by ambient light included in a predetermined range of the second luminance distribution have been set to be substantially equal to each other.

7. The three-dimensional shape determining method according to claim 6, wherein addition or subtraction of a luminance distribution, obtained by multiplying the third luminance distribution by a coefficient, is performed to either one of the first luminance distribution and the second luminance distribution so that an average value in the predetermined range of the first luminance distribution and an average value in the predetermined range of the second luminance distribution become equal to each other, and the intersection point is derived by using a luminance distribution obtained after the addition or the subtraction was performed.

8. The three-dimensional shape determining method according to claim 7, wherein the coefficient is a value which is obtained by dividing a difference between the average value in the predetermined range of the first luminance distribution and the average value in the predetermined range of the second luminance distribution by an average value in a predetermined range of the third luminance distribution.

9. The three-dimensional shape determining method according to claim 6, wherein
    addition or subtraction of a luminance distribution, obtained by multiplying the third luminance distribution by a coefficient, is performed to a difference distribution which is a difference in the predetermined ranges between the first luminance distribution and the second luminance distribution so that an average value of the difference distribution becomes zero, and the intersection point is derived by using the difference distribution obtained after the addition or the subtraction was performed.

10. The three-dimensional shape determining method according to claim 9, wherein the coefficient is a value which is obtained by dividing an average value in a predetermined range of the difference distribution by an average value in a predetermined range of the third luminance distribution.

* * * * *